US009383776B2

(12) United States Patent
Choi

(10) Patent No.: US 9,383,776 B2
(45) Date of Patent: Jul. 5, 2016

(54) DISPLAY DEVICE

(71) Applicant: SAMSUNG DISPLAY CO., LTD., Yongin, Gyeonggi-Do (KR)

(72) Inventor: Yongseok Choi, Daejeon (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 14/272,374

(22) Filed: May 7, 2014

(65) Prior Publication Data

US 2015/0123914 A1 May 7, 2015

(30) Foreign Application Priority Data

Nov. 1, 2013 (KR) .................. 10-2013-0132302

(51) Int. Cl.
*G06F 3/041* (2006.01)
*G06F 1/16* (2006.01)
*G06F 3/0487* (2013.01)
*G06F 3/01* (2006.01)

(52) U.S. Cl.
CPC .............. *G06F 1/1652* (2013.01); *G06F 3/011* (2013.01); *G06F 3/0487* (2013.01); *G06F 2203/04102* (2013.01); *G06F 2203/04803* (2013.01)

(58) Field of Classification Search
CPC ... G06F 3/0412; G06F 3/0416; G06F 1/1652; G06F 2203/04102; G06F 3/0487; G06F 3/011; G06F 2203/04803
See application file for complete search history.

(56) References Cited

U.S. PATENT DOCUMENTS

| 6,965,381 | B2 | 11/2005 | Kitamura et al. |
| 7,450,188 | B2* | 11/2008 | Schwerdtner .................... 349/15 |
| 8,427,420 | B2* | 4/2013 | Yamazaki ............. G06F 1/1616 345/100 |
| 2003/0227441 | A1* | 12/2003 | Hioki et al. .................... 345/156 |
| 2012/0124525 | A1 | 5/2012 | Kang |
| 2012/0306910 | A1* | 12/2012 | Kim et al. ..................... 345/619 |
| 2013/0229324 | A1* | 9/2013 | Zhang et al. .................... 345/1.3 |
| 2013/0265221 | A1* | 10/2013 | Lee et al. ....................... 345/156 |

FOREIGN PATENT DOCUMENTS

| JP | 2004-279866 A | 10/2004 |
| KR | 10-1019244 B1 | 3/2011 |
| KR | 10-1103120 B1 | 1/2012 |
| KR | 10-2012-0084943 A | 7/2012 |
| KR | 10-2013-0031176 A | 3/2013 |

OTHER PUBLICATIONS

Korean Patent Abstracts, Publication No. 1020100036861 A, dated Apr. 4, 2010, for corresponding Korean Patent No. KR 10-1019244 B1 listed above, 1 page.
Korean Patent Abstracts, Publication No. 1020110102076 A, dated Sep. 16, 2011, for corresponding Korean Patent No. KR 10-1103120 B1 listed above, 2 pages.

* cited by examiner

*Primary Examiner* — Andrew Sasinowski
(74) *Attorney, Agent, or Firm* — Lewis Roca Rothgerber Christie LLP

(57) ABSTRACT

A display device having a flexible display panel displaying an image; and a display panel shape change part setting up a bending axis crossing the flexible display panel according to input information and bending the flexible display panel along the bending axis, as the flexible display panel is bent, the flexible display panel is divided into a first region and a second region based on the bending axis.

16 Claims, 9 Drawing Sheets

DISPLAY DEVICE

CROSS-REFERENCE TO RELATED APPLICATION

This patent application claims priority to and the benefit of Korean Patent Application No. 10-2013-0132302, filed in the Korean Intellectual Property Office on Nov. 1, 2013, the entire contents of which are hereby incorporated by reference.

BACKGROUND

1. Field

The present inventive concept herein relates to a display device, and more particularly, to a flexible display device.

2. Description of the Related Art

Recently, a display device that can be bent or folded (hereinafter it is referred to as a flexible display device) has been developed. The flexible display device can be changed in many forms using a flexible display panel.

A flexible display device having many forms provides a variety of image information to a user. A flexible display device can provide a user with a convenient and optimized viewing environment.

SUMMARY

Embodiments of the inventive concept provide a display device. The display device may include a flexible display panel displaying an image; and a display panel shape change part setting up a bending axis crossing the flexible display panel according to input information and bending the flexible display panel along the bending axis. As the flexible display panel is bent, the flexible display panel is divided into a first region and a second region based on the bending axis, and the image comprises a first image being displayed on the first region and a second image which is displayed on the first region and provides independent information from the first image.

BRIEF DESCRIPTION OF THE FIGURES

Preferred embodiments of the inventive concept will be described below in more detail with reference to the accompanying drawings. The embodiments of the inventive concept may, however, be embodied in different forms and should not be constructed as limited to the embodiments set forth herein. Rather, these embodiments are provided so that this disclosure will be thorough and complete, and will fully convey the scope of the inventive concept to those skilled in the art. Like numbers refer to like elements throughout.

DETAILED DESCRIPTION

Figure 1:
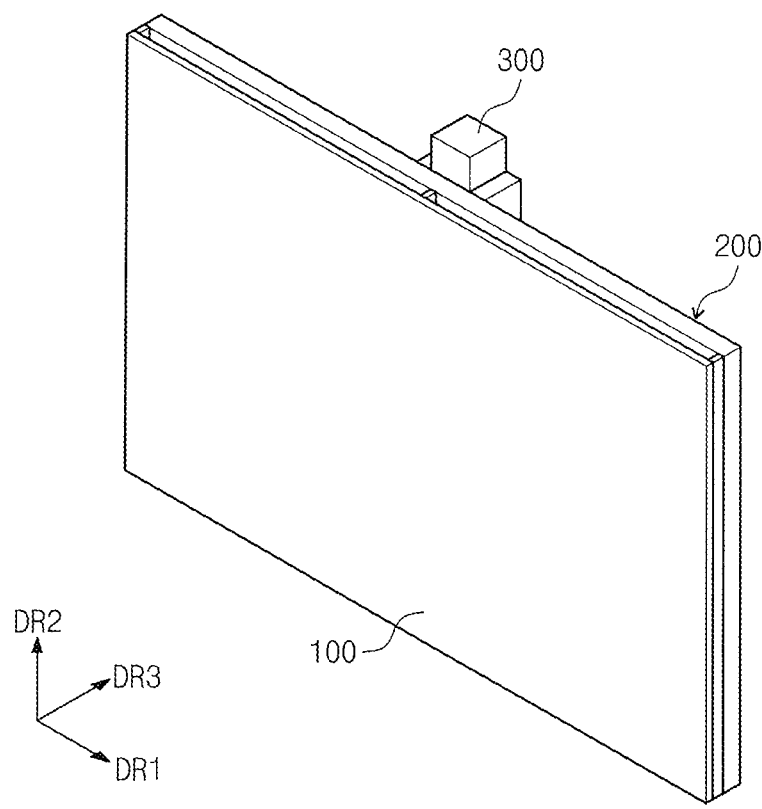
FIG. 1 is a perspective view of a display device in accordance with an embodiment of the inventive concept.

Embodiments of the inventive concepts of the present invention will be described more fully hereinafter with reference to the accompanying drawings, in which embodiments of the invention are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like reference numerals refer to like elements throughout.

Figure 2A:
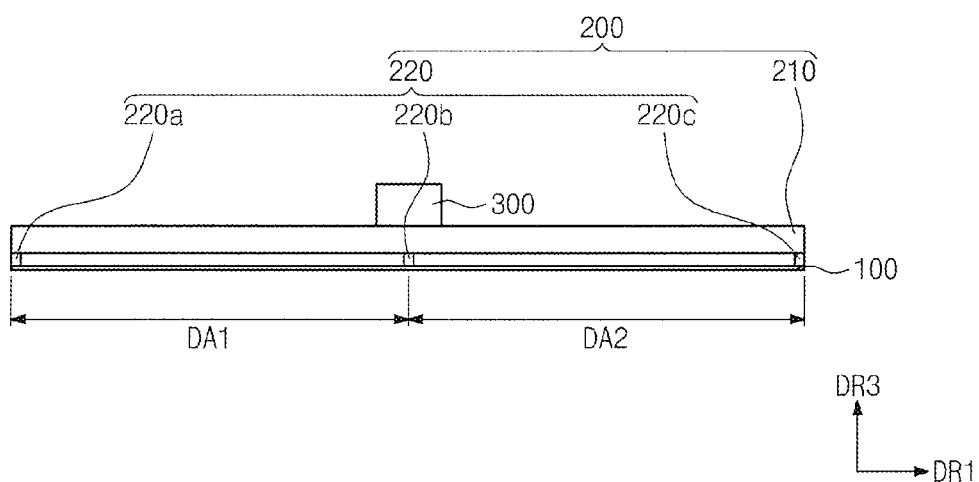
FIGS. 2A through 2C are side cross-sectional views of a display device in accordance with an embodiment of the inventive concept.
Figure 2B:
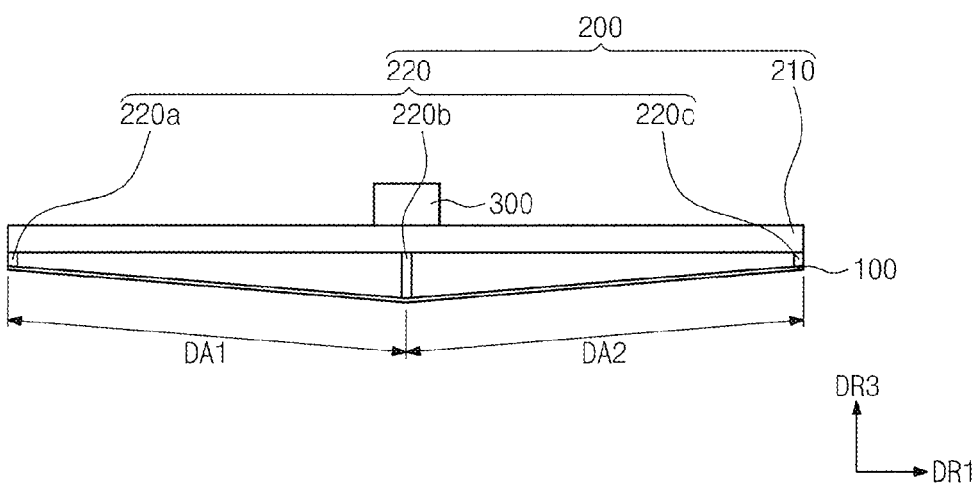
Figure 2C:
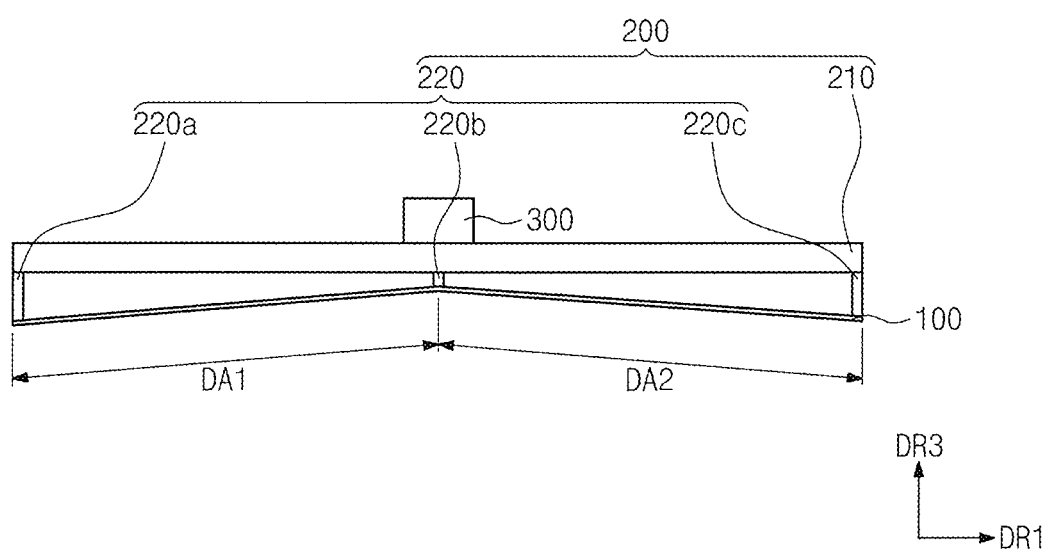

FIG. 1 is a perspective view of a display device in accordance with an embodiment of the inventive concept. FIGS. 2A through 2C are side cross-sectional views of a display device in accordance with an embodiment of the inventive concept.

As illustrated in FIG. 1, the display device may include a flexible display panel 100 and a display panel shape change part 200.

The flexible display panel 100 includes a flexible substrate (not shown), signal interconnections (not shown) disposed on the flexible substrate and pixels (not shown) electrically connected to the signal interconnections. The pixels generate images on the basis of signals received from the signal interconnections. The flexible display panel 100 displays an image on one side of the flexible display panel.

The flexible display panel 100 displays an image on a flat surface defined by a first direction DR1 and a second direction DR2. The flexible display panel 100 may be constituted by a front side and a back side facing each other. The image is displayed on the front side and the displayed image is provided to a user. The back side faces the display panel shape change part 200. The back side may be in contact with the display panel shape change part 200.

A display panel that is flexible and easily thin-filmed may be selected as the flexible display panel 100. An organic light emitting display (OLED) panel, an electrophoretic display panel, or an electrowetting display panel may be applied to the flexible display panel 100. The flexible display panel 100 can be bent or rolled to form a curved surface all around and can be bent along a bending axis which will be described subsequently herein.

The display panel shape change part 200 changes a shape of the flexible display panel 100. The display panel shape change part 200 bends the flexible display panel 100. The display panel shape change part 200 bends the flexible display panel 100 according to input information.

The display device may further include a search unit 300. The search unit 300 senses an external condition of the display device to generate the input information. The search unit 300 senses the external condition and provides sensing data corresponding to the sensed external condition to the display panel shape change part 200 as input information.

The external condition includes locations of users of the display device and the number of the users. The search unit 300 may be a camera, an infrared sensor, or a location detecting sensor that can detect the external condition.

The display panel shape change part 200 is described in detail with reference to FIGS. 2A through 2C. The display panel shape change part 200 may include a body part 210 and an instrument unit 220. The body part 210 may have the same shape as the flexible display panel 100. The body part 210 covers a back side of the flexible display panel 100, and supports the instrument unit 220 and the flexible display panel 100.

The instrument unit 220 is disposed between the body part 210 and the flexible display panel 100. The instrument unit 220 may include at least one length control part. In the embodiment of the inventive concept, the instrument unit 220 includes a plurality of length control parts 220a, 220b and 220c.

The length control parts 220a, 220b and 220c include one side control part 220a disposed on one side of the flexible display panel 100, the other side control part 220c disposed on the other side of the flexible display panel 100 and a middle control part 220b disposed between the one side and the other side.

Lengths of the length control parts 220a, 220b and 220c may be changed in a thickness direction DR3 (hereinafter it is referred to as a third direction) of the flexible display panel 100. The length control parts 220a, 220b and 220c support corresponding areas of the flexible display panel 100 and can be adhered to a back side of the flexible display panel 100.

As lengths of the length control parts 220a, 220b and 220c are changed, a shape of the flexible display panel 100 is changed. The flexible display panel 100 may be convexly or gently bent.

As illustrated in FIG. 2B, the display panel shape change part 200 can convexly bend the flexible display panel 100 so that the center of the flexible display panel 100 approaches a user. As a length of the middle control part 220b among the length control parts 220a, 220b and 220c is changed, a corresponding area of the flexible display panel 100 is convexly bent in a third direction DR3. In this case, if lengths of the one side control part 220a and the other side control part 220c are changed at the same time, a bending angle may increase.

As illustrated in FIG. 2C, the display panel shape change part 200 can concavely bend the flexible display panel 100 so that the both sides of the flexible display panel 100 approaches a user. As lengths of the one side control part 220a and the other side control part 220c are changed, one side and the other side of the flexible display panel 100 are bent in a third direction DR3. In this case, if a length of the middle control part 220b is changed at the same time, a bending angle may increase.

As the flexible display panel 100 is bent, it may be divided into a plurality of areas. The areas may include a first region DA1 and a second region DA2 that are arranged in the second direction DR2. A first image may be displayed on the first region DA1 and a second image may be displayed on the second region DA2. The first and second images can provide independent information respectively.

In another embodiment, the flexible display panel 100 may further include a third area (not shown) that is arranged in the second direction DR2 and adjacent to the second region DA2.

Although not illustrated in the drawing, the display panel shape change part 200 may further include a driving part for signal processing. The driving part generates bending information on the basis of external input information received from the search unit 300. The generated bending information may be provided to the instrument unit 220 to control a drive of the instrument unit 220. FIGS. 2A through 2C are only an illustration and the display panel shape change part 200 may have a variety of structures that can change a shape of the flexible display panel 100.

Figure 3:
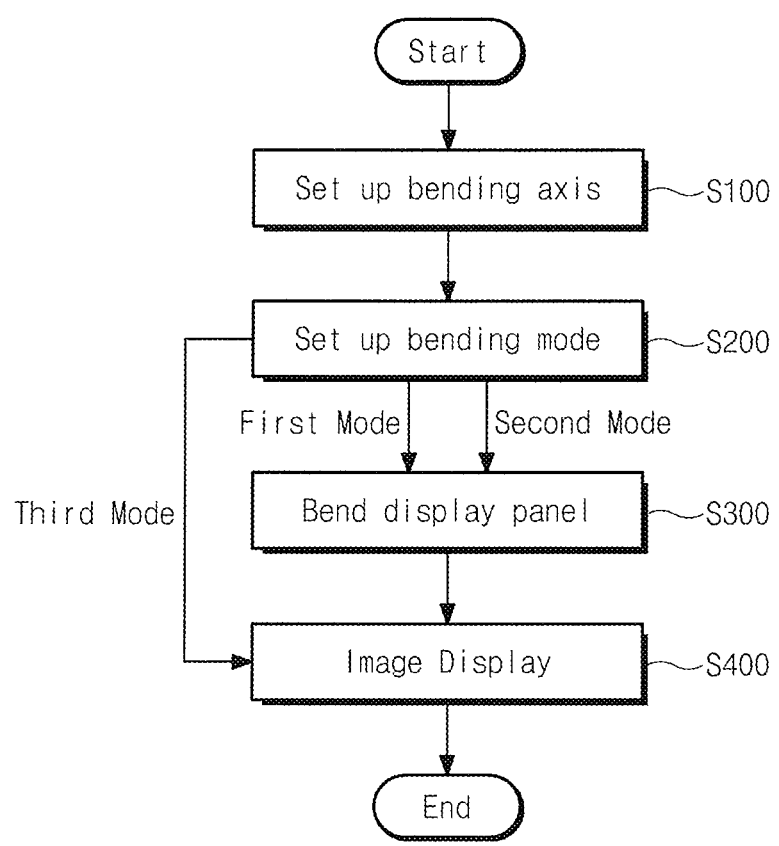
FIG. 3 is a flow chart for explaining an image display method of a display device in accordance with an embodiment of the inventive concept.
Figure 4A:
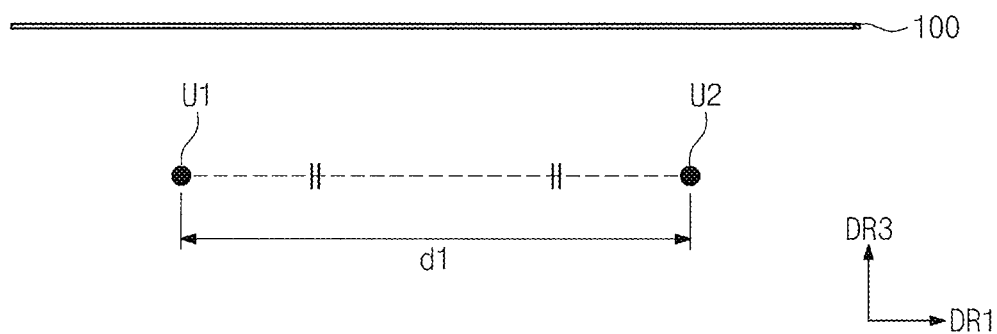
FIGS. 4A through 4C are diagrams for explaining an operation of a display device in accordance with an embodiment of the inventive concept.
Figure 4B:
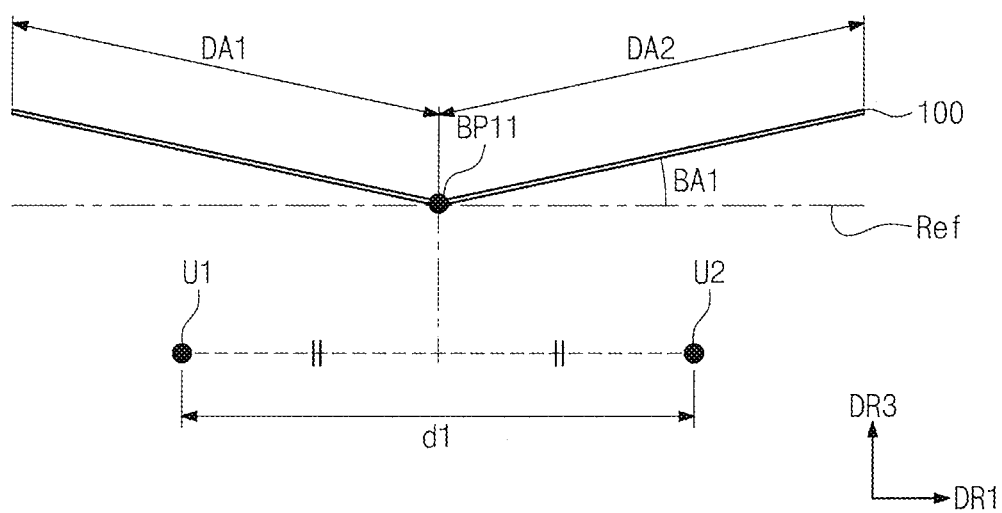
Figure 4C:
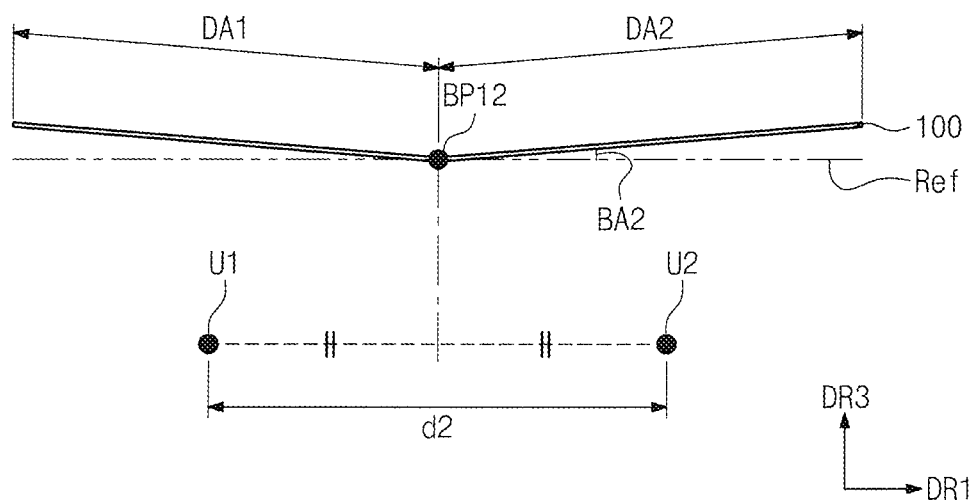

FIG. 3 is a flow chart for explaining an image display method of a display device in accordance with an embodiment of the inventive concept. FIGS. 4A through 4C are diagrams for explaining an operation of a display device in accordance with an embodiment of the inventive concept.

As illustrated in FIG. 3, the display panel starts a bending axis setting step S100. In the bending axis setting step S100, the display panel shape change part 200 receives the input information to set up a bending axis BP.

Next, a bending mode setting step S200 proceeds. In the bending mode setting step S200, a bending direction of the flexible display panel 100 is set up. The bending mode may be divided into a first mode, a second mode and a third mode according to the bending direction of the flexible display panel 100.

The display device proceeds to a display panel bending step S300 in the first mode and the second mode. The display device directly proceeds to an image display step S400 in the third mode.

The first mode relates to the embodiment illustrated in FIG. 2B. The first mode is a mode that the flexible display panel 100 is convexly bent. The second mode relates to the embodiment illustrated in FIG. 2C. The second mode is a mode that the flexible display panel 100 is concavely bent. The third mode is a mode that the flexible display panel 100 is not bent. The third mode may correspond to the embodiment illustrated in FIG. 2A.

After a display device corresponding to the first and second modes is bent, it displays an image on the flexible display panel 100. A display device corresponding to the third mode displays an image on the flexible display panel 100 without a bending operation. The bending step (S300) of the flexible display panel and the image display step (S400) of the flexible display panel according to each mode will be described in detail with reference to diagrams below.

FIGS. 4A through 4C are diagrams for explaining an operation of a display device corresponding to the first mode. An embodiment that users U1 and U2 are located in a front side of the flexible display panel 100 is illustrated in FIGS. 4A through 4C. For explanation purposes, the display panel shape change part 200 and the search unit 300 are omitted.

As illustrated in FIG. 4A, the users U1 and U2 are located to be spaced a first distance $d_1$ apart from each other. The first distance $d_1$ means a distance projected onto a front side of the flexible display panel 100 of a flat state. Thus, although not illustrated, distances between the respective users U1 and U2 and the flexible display panel 100 may be different from each other.

As illustrated in FIG. 4B, in the case that the first distance d1 exceeds a critical distance, the flexible display panel 100 is bent. The display panel shape change part 200 sets up a bending axis $BP_{11}$ within the limit of the first distance $d_1$. For instance, the bending axis $BP_{11}$ can be set at the point crossing the center of the first distance $d_1$.

In FIGS. 4B and 4C, both ends of the flexible display panel 100 are bent toward the back side from a reference line Ref. In FIG. 4B, the flexible display panel 100 is bent at a predetermined bending angle BA1. The bending angle may differ depending on a location relation between a user and the flexible display panel.

A distance between the first user U1 and a left end of the flexible display panel 100 may be equal to a distance between the first user U1 and the bending axis $BP_{11}$. A distance between the second user U2 and a right end of the flexible display panel 100 may be equal to a distance between the second user U2 and the bending axis $BP_{11}$.

In FIG. 4C, the first user U1 and the second user U2 are located to be spaced a second distance $d_2$ smaller than the first distance $d_1$ apart from each other. The second distance $d_2$ is greater than the critical distance.

As illustrated in FIG. 4C, the bending axis $BP_{12}$ is set within the limit of the second distance $d_2$. For instance, the bending axis $BP_{12}$ can be set at the point crossing the center of the second distance $d_2$.

As described above, a bending angle BA2 may be affected by a location relation between a user and the flexible display panel 100. When the bending axis is set at the same location, as a distance between the first user U1 and the second user U2 becomes smaller, the degree of bending of the flexible display panel 100 is reduced. Thus, when the first user U1 and the second user U2 are located to be spaced the second distance $d_2$ smaller than the first distance $d_1$ apart from each other, the bending angle becomes small.

As illustrated in FIGS. 4B and 4C, in the first mode, the bending axis BP of the flexible display panel 100 is convexly bent. As the flexible display panel 100 is bent, it may be divided into a plurality of areas. In the embodiment, the flexible display panel 100 is divided into the first region DA1 and the second region DA2.

The first region DA1 provides a first image to the first user U1 located in the front side of the first region DA1 among the users. The second region DA2 provides a second image to the second user U2 located in the front side of the second region DA2 among the users.

The first image and the second image provide independent information respectively. For instance, the first user U1 and the second user U2 can respectively watch an independent image from an independent screen being provided to a different location. The first image and the second image may provide same or different information. Thus, the display device in accordance with the inventive concept can provide an optimized viewing environment to users at different locations.

Figure 5A:
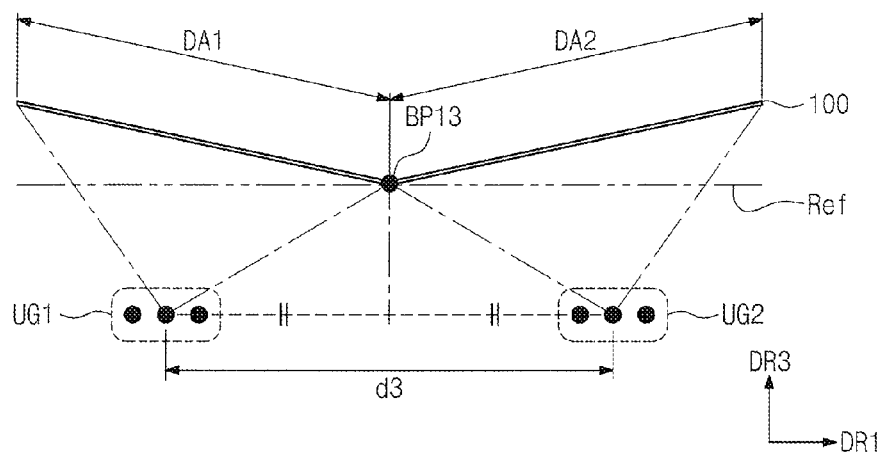
FIGS. 5A and 5B are diagrams for explaining an operation of a display device in accordance with another embodiment of the inventive concept.
Figure 5B:
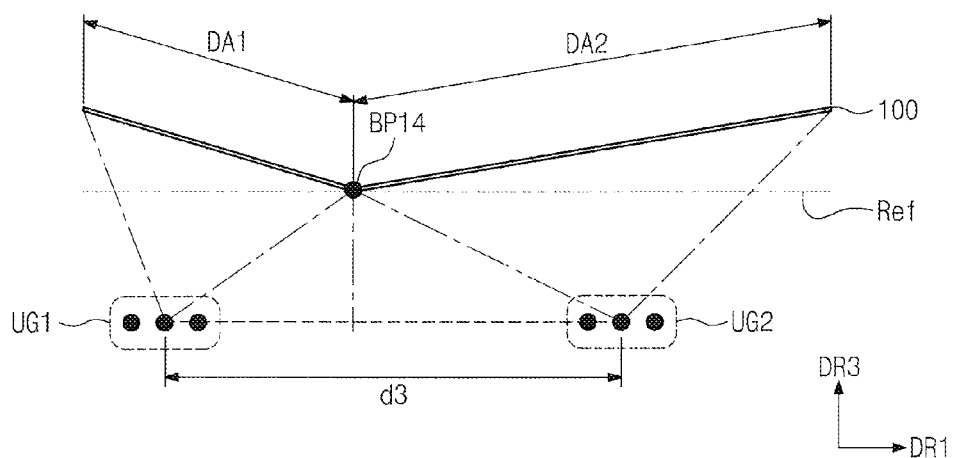

FIGS. 5A and 5B are diagrams for explaining an operation of a display device in accordance with another embodiment of the inventive concept. In FIG. 5A, the first mode embodiment of when the number of first user group UG1 is the same as the number of a second user group UG2 is illustrated. In FIG. 5B, the first mode embodiment of when the number of first user group UG1 is different from the number of a second user group UG2 is illustrated. In FIGS. 5A and 5B, both ends of the flexible display panel 100 are bent toward the back side from the reference line Ref respectively.

The first user group UG1 is located to be adjacent to the first region DA1. The second user group UG2 is located to be adjacent to the second region DA2. The center of the first user group UG1 may correspond to the first user U1 and the center of the second user group UG2 may correspond to the second user U2.

As the flexible display panel 100 is bent, it may be divided into a plurality of areas with a bending axis as the center. The areas include a first region DA1 providing information to the first user group UG1 and a second region DA2 providing information to the second user group UG2.

The display panel shape change part 200 can set the bending axis so as to correspond to a ratio of the number of users between the user groups UG1 and UG2. Areas occupied by the first region DA1 and the second region DA2 become different from each other depending on a location where the bending axis is set. For instance, an area of the first region DA1 and an area of the second region DA2 may be in proportion to the number of users located in a front side of the respective areas.

The first user group UG1 is spaced apart from the second user group UG2 by a third distance $d_3$. The third distance $d_3$ is corresponding to a projected distance obtained from projecting the third distance $d_3$ onto the flexible display panel 100 in plane. As described above, a bending axis BP13 which is set when the number of users of the first user group UG1 is the same the number of users of the second user group UG2 is formed within the range of a separation distance $d_3$ between the center of the first user group UG1 and the center of the second user group UG2.

If the bending axis BP13 is set up, the first region DA1 and the second region DA2 is divided with the bending axis as the center. A ratio of an area of the first region DA1 to an area of the second region DA2 may be in proportion to a ratio of the number of users of the first user group UG1 to the number of users of the second user group UG2.

As illustrated in FIG. 5A, in the case that the number of users of the first user group UG1 is the same as the number of users of the second user group UG2, an area of the first region DA1 is mostly equal to an area of the second region DA2. In this case, the bending axis $BP_{13}$ can be set at the point crossing the center of the separation distance $d_3$.

Unlike that, as illustrated in FIG. 5B, in the case that the number of users of the first user group UG1 is smaller than the number of users of the second user group UG2, an area of the first region DA1 may be smaller than an area of the second region DA2. In this case, the bending axis $BP_{13}$ is set at the point nearer to the first user group UG1 having a relatively small number of users.

The degree of bending of the flexible display panel 100 can be controlled by a location relation between the first user group UG1 adjacent to the first region DA1 and the flexible display panel 100 and between the second user group UG2 adjacent to the second region DA2 and the flexible display panel 100.

As illustrated in FIG. 5A, a distance between the center of the first user group UG1 and a left end of the flexible display panel 100 may be equal to a distance between the center of the first user group UG1 and the bending axis $BP_{13}$. A distance between the center of the second user group UG2 and a right end of the flexible display panel 100 may be equal to a distance between the center of the second user group UG2 and the bending axis $BP_{13}$.

As illustrated in FIG. 5B, the degree of bending of the flexible display panel 100 may be determined by a location relation between the flexible display panel 100 and the respective user groups having a different number of users. A distance between the center of the first user group UG1 and a left end of the flexible display panel 100 may be equal to a distance between the center of the first user group UG1 and the bending axis $BP_{14}$. A distance between the center of the second user group UG2 and a right end of the flexible display panel 100 may be equal to a distance between the center of the second user group UG2 and the bending axis $BP_{14}$.

In the display device in accordance with the inventive concept, an area of a display area may be controlled to correspond to the number of users. The display device can provide the best viewing environment to users considering external conditions including the number of users and locations of users.

Figure 6A:
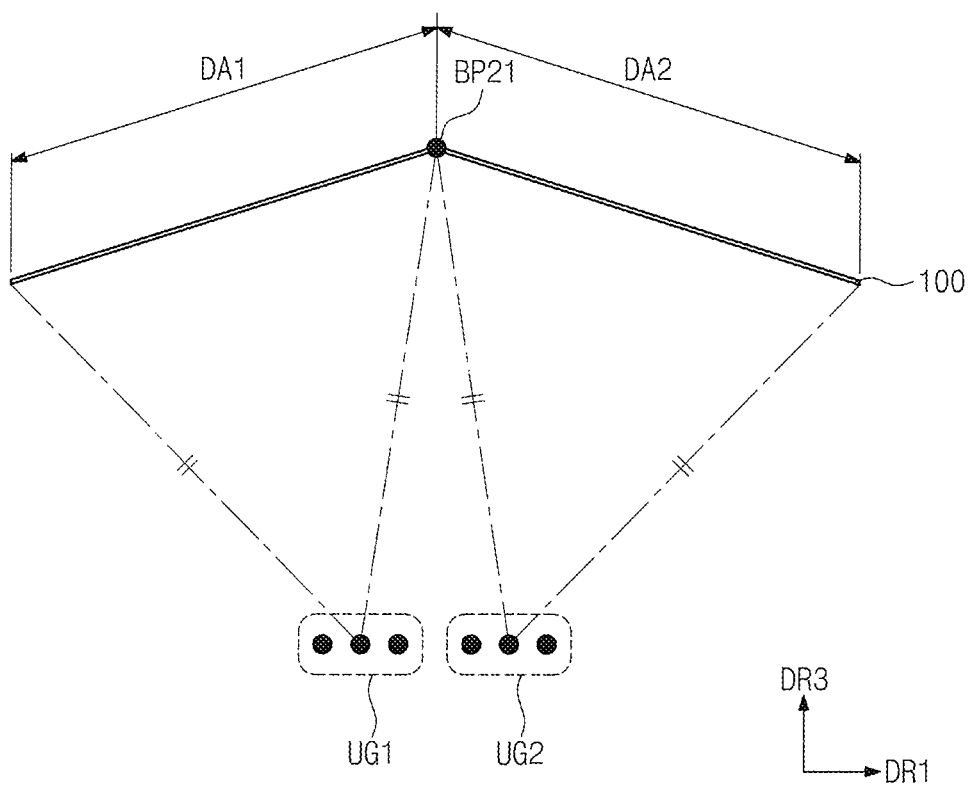
FIGS. 6A and 6B are diagrams for explaining an operation of a display device in accordance with still another embodiment of the inventive concept.
Figure 6B:
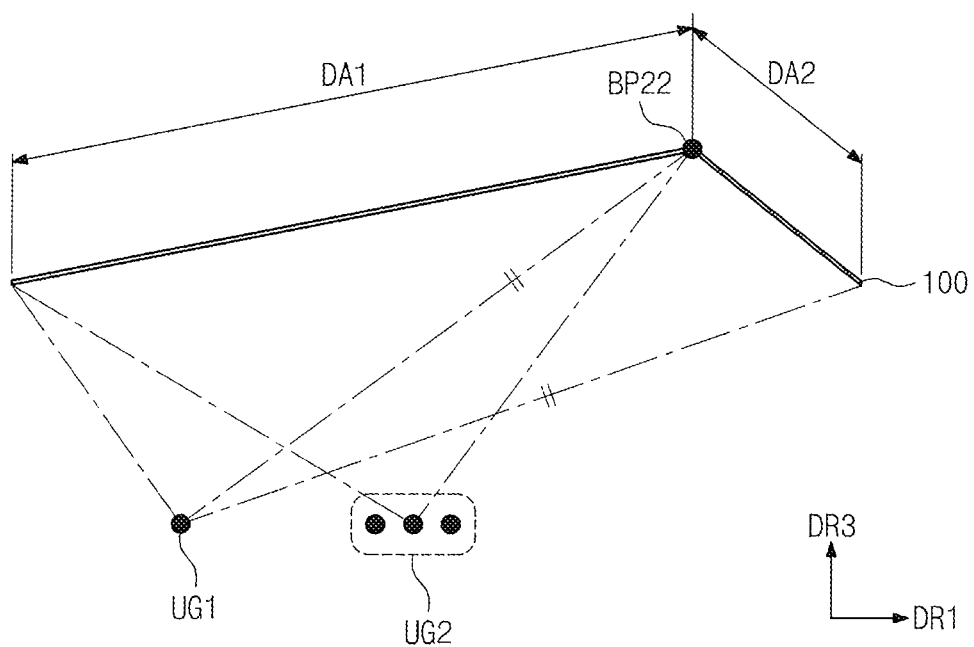

FIGS. 6A and 6B are diagrams for explaining an operation of a display device in accordance with still another embodiment of the inventive concept. An embodiment corresponding to the second mode is illustrated in FIGS. 6A and 6B.

As illustrated in FIGS. 6A and 6B, the flexible display panel 100 is concavely bent. A shape of the flexible display panel 100 is changed so that an area corresponding to a bending axis is moved away from users.

A plurality of user groups may be located in a front side of the flexible display panel 100. The user groups may include a first user group UG1 and a second user group UG2. The first user group UG1 is located to be adjacent to a first region DA1. The second user group UG2 is located to be adjacent to a second region DA2.

An embodiment that user groups UG1 and UG2 including the same number of users are located is illustrated in FIG. 6A. An embodiment that user groups UG1 and UG2 including a different number of users are located is illustrated in FIG. 6B.

As the flexible display panel 100 is bent, it can be divided into a plurality of areas based on a bending axis ($BP_{21}$, $BP_{22}$). The flexible display panel 100 can be divided into the first region DA1 disposed on the left side and the second region DA2 disposed on the right side on the basis of a front side of the flexible display panel 100.

Each area provides an independent image to users located in a front side of each area. The first region DA1 provides a first image to the second user group UG2. The second region DA2 provides a second image to the first user group UG1. The first and second images provide independent and finished information respectively. Information which the first and second images provide may be the same or different from each other.

The flexible display panel 100 may be bent so that distances between both ends of the first region DA1 and the center of the first user group UG1 are equal to respective distances between both ends of the second region DA2 and the center of the second user group UG2. The first region DA1 provides information to the second user group UG2. The second region DA2 provides information to the first user group UG1. Accordingly, in the second mode, the first user group UG1 may correspond to the first region DA1 and the second user group UG2 may correspond to the second region DA2.

As illustrated in FIG. 6A, a distance between the center of the first user group UG1 and a right end of the flexible display panel 100 may be equal to a distance between the center of the first user group UG1 and the bending axis $BP_{21}$. A distance between the center of the second user group UG2 and a left end of the flexible display panel 100 may be equal to a distance between the center of the second user group UG2 and the bending axis $BP_{21}$.

As illustrated in FIG. 6B, the degree of bending of the flexible display panel 100 may be different depending on the number of users constituting the user groups UG1 and UG2. The display panel shape change part 200 can set the bending axis $BP_{22}$ so that a ratio of an area of the first region DA1 to an area of the second region DA2 is in proportion to a ratio of the number of users of the second user group UG2 to the number of users of the first user group UG1.

The bending axis $BP_{22}$ may be set at the point nearer to the second user group UG2 having a larger number of users on the flexible display panel 100. An area ratio of the first region DA1 to the second region DA2 is different depending on a location of the bending axis $BP_{22}$. Thus, an area of the first region DA1 providing information to the second user group UG2 may be greater than an area of the second region DA2 providing information to the first user group UG1.

According to that described above, the display device in accordance with the inventive concept senses the number of users and locations of the users to set up a bending axis. By changing a location of the bending axis, an area of a display area being provided to a user may become different. Separate independent contents can be displayed on respective display areas and thereby independent and optimized viewing environment can be provided to users.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents. Therefore, the above-disclosed subject matter is to be considered illustrative, and not restrictive.

What is claimed is:

1. A display device comprising:
a flexible display panel configured to display an image; and
a display panel shape change part configured to set up a bending axis on the flexible display panel according to input information and configured to bend the flexible display panel along the bending axis, the display panel shape change part comprising a body part and length control parts,
wherein at least one of the length control parts is configured to change a length thereof to bend the flexible display panel, and
wherein as the flexible display panel is bent, the entire body part remains planar, the flexible display panel is divided into a first region and a second region based on the bending axis, and the image comprises a first image being displayed on the first region and a second image which is displayed on the second region and provides independent information from the first image.

2. A display device comprising:
a flexible display panel for displaying an image; and
a display panel shape change part for setting up a bending axis on the flexible display panel according to input information and bending the flexible display panel along the bending axis,
wherein as the flexible display panel is bent, the flexible display panel is divided into a first region and a second region based on the bending axis, and the image comprises a first image being displayed on the first region and a second image which is displayed on the second region and provides independent information from the first image, and
wherein the input information comprises a projected distance obtained from projecting a distance between user groups located at a front side of the flexible display panel onto the front side of the flexible display panel and a number of respective users of the user groups.

3. The display device of claim 2, wherein when the projected distance exceeds a critical distance, the flexible display panel is bent.

4. The display device of claim 3, wherein a location of the bending axis is set within a range of the projected distance on the flexible display panel and the bending axis overlaps with the projected distance in a plane.

5. The display device of claim 4, wherein the flexible display panel is configured to be convexly bent around the bending axis.

6. The display device of claim 5, wherein the location of the bending axis is changed by the number of respective users constituting the user groups.

7. The display device of claim 6, wherein the location of the bending axis is set to be nearer to the user group having a smaller number of users among the user groups.

8. The display device of claim 7, wherein the user groups comprises:
a first user group located nearer to the first region; and
a second user group located nearer to the second region,
wherein the first region provides the first image to the first user group and the second region provides the second image to the second user group.

9. The display device of claim 8, wherein the display panel shape change part is configured to set up the bending axis so that a ratio of an area of the first region to an area of the second region is proportional to a ratio of the number of users of the first user group to the number of users of the second user group.

10. The display device of claim 9, wherein the flexible display panel is configured to bend so that a distance between a center of the first user group and one end of the flexible display panel adjacent to the first region is the same as a distance between the center of the first user group and the bending axis, and a distance between a center of the second user group and the other end of the flexible display panel adjacent to the second region is the same as a distance between the center of the second user group and the bending axis.

11. The display device of claim 8, wherein the first image and the second image provide different information from each other.

12. The display device of claim 3, wherein the flexible display panel is configured to concavely bent around the bending axis.

13. The display device of claim 12, wherein the user groups comprises:
    a first user group located near to the first region; and
    a second user group located near to the second region,
    wherein the first region provides the first image to the second user group and the second region provides the second image to the first user group.

14. The display device of claim 13, wherein the display panel shape change part is configured to set up the bending axis so that a ratio of an area of the first region to an area of the second region is inversely proportional to a ratio of the number of users of the first user group to the number of users of the second user group.

15. The display device of claim 14, wherein the flexible display panel is configured to bend so that a distance between a center of the second user group and one end of the flexible display panel adjacent to the first region is the same as a distance between the center of the second user group and the bending axis, and a distance between a center of the first user group and the other end of the flexible display panel adjacent to the second region is the same as a distance between the center of the first user group and the bending axis.

16. A display device comprising:
    a flexible display panel for displaying an image;
    a display panel shape change part for setting up a bending axis on the flexible display panel according to input information and bending the flexible display panel along the bending axis; and
    a search unit for measuring a distance obtained from projecting a distance between user groups located at a front side of the flexible display panel onto the front side of the flexible display panel and a number of respective users of the user groups,
    wherein as the flexible display panel is bent, the flexible display panel is divided into a first region and a second region based on the bending axis, and the image comprises a first image being displayed on the first region and a second image which is displayed on the second region and provides independent information from the first image, and
    wherein the input information is provided from the search unit.

* * * * *